(12) United States Patent
Chugg et al.

(10) Patent No.: US 7,010,069 B2
(45) Date of Patent: Mar. 7, 2006

(54) METHOD FOR CO-CHANNEL INTERFERENCE IDENTIFICATION AND MITIGATION

(75) Inventors: Keith M. Chugg, Burbank, CA (US); Gent Paparisto, Carlsbad, CA (US); Prokopios Panagiotou, Lakewood, CA (US)

(73) Assignee: Trellisware Technologies, Inc., San Diego, CA (US)

( * ) Notice: Subject to any disclaimer, the term of this patent is extended or adjusted under 35 U.S.C. 154(b) by 848 days.

(21) Appl. No.: 10/006,795

(22) Filed: Dec. 4, 2001

(65) Prior Publication Data

US 2002/0150187 A1    Oct. 17, 2002

Related U.S. Application Data

(60) Provisional application No. 60/251,254, filed on Dec. 4, 2001.

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 7/10 | (2006.01) |

(52) U.S. Cl. ...................... 375/346; 375/285
(58) Field of Classification Search ............... 375/224, 375/285, 340, 346, 348; 455/63.1, 67.13, 455/226.1, 296; 370/201
See application file for complete search history.

(56) References Cited

U.S. PATENT DOCUMENTS

| | | | | |
|---|---|---|---|---|
| 4,995,104 A | * | 2/1991 | Gitlin | 370/201 |
| 5,345,476 A | * | 9/1994 | Tsujimoto | 375/233 |
| 5,349,607 A | * | 9/1994 | Moreno | 375/341 |
| 5,537,443 A | * | 7/1996 | Yoshino et al. | 375/340 |
| 5,673,288 A | * | 9/1997 | Okanoue | 375/231 |
| 5,673,294 A | * | 9/1997 | Namekata | 375/341 |
| 5,757,844 A | * | 5/1998 | Fukawa et al. | 375/136 |
| 5,768,254 A | * | 6/1998 | Papadopoulos et al. | 370/201 |
| 5,995,499 A | * | 11/1999 | Hottinen et al. | 370/337 |
| 5,995,565 A | * | 11/1999 | Tong et al. | 375/346 |
| 6,064,703 A | * | 5/2000 | Cusani et al. | 375/349 |
| 6,111,910 A | * | 8/2000 | Cui et al. | 375/142 |
| 6,144,710 A | * | 11/2000 | Chen et al. | 375/346 |
| 6,249,518 B1 | * | 6/2001 | Cui | 370/347 |
| 6,304,618 B1 | * | 10/2001 | Hafeez et al. | 375/341 |

(Continued)

OTHER PUBLICATIONS

G. Paparisto et al., "A Single-Packet Method for Adaptive Maximum Likelihood CCI Identification and Mitigation" *Global Telecommunications Conference, Dec. 5-9, 1999, Rio de Janeiro, Brazil, Globecom 1999*, General Conference (Part A), vol. 1, pp. 492-496 (Dec. 1999).

*Primary Examiner*—Jean B. Corrielus
(74) *Attorney, Agent, or Firm*—Townsend and Townsend and Crew LLP

(57) ABSTRACT

A method for co-channel interference identification and mitigation employs adaptive sequence detection in connection with a model composed of a signal of interest and a combination of other signals which constitute interference in a channel of interest, wherein the signal of interest is distinguished from the interference by adaptive tracking of signal parameters of all identifiable signals. In a particular embodiment, the process involves estimating the number and time spans of co-channel interference channels based on maximum likelihood estimation and minimum description length from training information derived from a single time division multiple access packet; and then applying the estimate to mitigation of co-channel interference at a receiver. Per-survivor-processing is one technique for adaptive sequence detection.

35 Claims, 5 Drawing Sheets

U.S. PATENT DOCUMENTS

| | | | |
|---|---|---|---|
| 6,418,175 B1 * | 7/2002 | Pukkila et al. | 375/347 |
| 6,463,105 B1 * | 10/2002 | Ramesh | 375/262 |
| 6,714,609 B1 * | 3/2004 | Keisala | 375/349 |
| 6,744,814 B1 * | 6/2004 | Blanksby et al. | 375/232 |
| 6,853,681 B1 * | 2/2005 | Lindoff | 375/231 |
| 2005/0084045 A1 * | 4/2005 | Stewart et al. | 375/350 |

* cited by examiner

METHOD FOR CO-CHANNEL INTERFERENCE IDENTIFICATION AND MITIGATION

CROSS REFERENCES TO RELATED APPLICATIONS

This invention is a non-provisional application of U.S. Provisional Application No. 60/251,254 filed Dec. 4, 2000, the content of which is incorporated herein by reference.

STATEMENT AS TO RIGHTS TO INVENTIONS MADE UNDER FEDERALLY SPONSORED RESEARCH OR DEVELOPMENT

This invention was made under partial sponsorship of U.S. Army CECOM under Contract No. DAA H07-98-C-J403. The U.S. Government retains some rights to this invention.

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to digital signal information demodulation and more particularly this invention relates to demodulation of packet-based wireless signals in the presence of interference from one or more of a known class of packet-based signals. Current narrowband Time Division Multiple Access (TDMA) cellular systems, such as IS-54 or GSM, are designed to accommodate several time-multiplexed users in the same RF channel, thus providing a capacity improvement over older analog Advanced Mobile Phone Service (AMPS) Frequency Division Multiple Access (FDMA) systems. This capacity is limited by frequency reuse, which is related to a receiver's ability to tolerate Co-Channel Interference (CCI), especially with cell splitting and cell reduction as in Personal Communication Service (PCS) systems.

FIG. 1 is a diagram of a cellular network utilizing frequency reuse. The figure shows a "7/21" reuse pattern, corresponding to a reuse factor of 7, with 120 degrees sectoring, which is know to those skilled in the art. In cells involving frequency reuse, the receiver must detect and receive a desired signal from an Intended User (IU) in spite of CCI signals that share the same RF channel. The presence of CCI signals may degrade the Bit Error Rate (BER) associated with reception of the desired signal by orders of magnitude, even when the CCI power is significantly below that of the IU. Furthermore, multipath-induced Intersymbol Interference (ISI) in frequency selective fading channels constitutes another major source of degradation. Hence, CCI and ISI mitigation capabilities of a receiver can lead to increased capacity and better overall system performance.

Existing CCI mitigation techniques attempt to suppress the contribution from the interfering signals to the received waveform. One class of such techniques employs antenna arrays that can introduce spatial nulls in the direction of the CCI and enhance the IU(s). The applicability of these techniques, however, is constrained by the number of antenna elements. (Typically, the number of beams or nulls formed cannot exceed the number of elements.) Similarly, there are user/CCI geometries for which linear combining techniques necessarily fail (e.g., when an interferer and the IU signals lie in regions where a linear combiner has equal gain). Another class of CCI mitigation techniques uses traditional Decision-Feedback Equalizers (DFE) that exploit the cyclo-stationary nature of CCI in order to reduce its effect in the detection of the IU. These techniques are effective in cases when the IU and the CCI signals are separated in some dimension (e.g., space or time). However, they are prone to severe performance degradation when there is little or no separation. Furthermore, even in cases of good separation, suppression of strong CCI signals can still result in significant reduction of the received Signal-to-Noise Ratio (SNR) for the IU.

Joint detection techniques provide an optimal approach to data detection in the presence of ISI and CCI. In contrast to the traditional approaches described above, joint detection techniques do not attempt to null the CCI signals; they model and detect CCI signals along with the desired signal from the IU. Detection of CCI signals is introduced as a way of assisting the detection of the IU, not as a goal of its own.

One straight-forward method using joint detection techniques is disclosed in U.S. Pat. No. 6,249,518B1 entitled TDMA SINGLE ANTENNA CO-CHANNEL INTERFERENCE CANCELLATION issued Jun. 19, 2001 to Jian Cui and assigned to Nortel Networks. This patent describes an approach to cancellation of co-channel interference from TDMA packet-based signals. The approach assumes a simplified channel model wherein the channel is assumed to be memoryless so that decision feedback does not need to take into account pre-existing states of the desired signal or of the interference. Hence, the system uses a multi-stage block decision feedback channel gain estimation algorithm and a memoryless joint detection algorithm. However, since the memoryless model breaks down in systems with a transmission bandwidth larger than the coherence bandwidth of the channel, the receiver fails to provide significant mitigation of co-channel interference and totally fails to provide any mitigation of intersymbol interference.

Another approach to cancellation of co-channel interference from TDMA packet-based signals is disclosed in U.S. Pat. No. 5,995,499 entitled SIGNAL DETECTION IN A TDMA SYSTEM issued Nov. 30, 1999 to Hottinen et al. and assigned to Nokia Telecommunications Oy.

The following references selected from the paper forming the basis of the priority provisional application, namely, G. Paparisto, P. Panagiotou, and K. M. Chugg, "A Single Packet Method for Adaptive Maximum Likelihood CCI Identification and Mitigation," published Proc. of IEEE Globecom Conference, Rio de Janiero, Brazil, Dec. 8, 1999, represent background and the general state of the art:

J. Lin, F. Ling, and J. Proakis, "Joint data and channel estimation for TDMA mobile channels," in Proc. PIMRC '92, October 1992, pp. 235–239. This paper describes PSP for ISI mitigation.

N. W. K. Lo, D. D. Falconer, and A. U. H. Sheikh, "Adaptive equalization for co-channel interference in a multipath fading environment," IEEE Trans. Commun., vol. 43, pp. 1441–1453, February/March/April 1995. This paper describes an alternative co-channel interference mitigation algorithm.

S. Verdu, "Minimum probability of error for asynchronous Gaussian multiple-access channels," IEEE Trans. Inform. Theory, vol. IT-32, pp. 85–96, January 1986. This paper is the seminal paper on joint modeling of interference.

R. A. Iltis, "A digital receiver for demodulation of CDMA waveforms with a-priori unknown delays and amplitudes,"

Proc. MILCOM'91, 1991, pp. 5.3.1–5.3.4. This paper describes a PSP-based interference mitigation algorithm for CDMA waveforms.

K. Giridhar, S. Chari, J. J. Shynk, and R. P. Gooch, "Joint demodulation of co-channel signals using MLSE and MAPSD algorithms," Proc. ICASSP '93, April 1993, vol. 4, pp. 160–163. This paper describes a technique for demodulation of co-channel signals.

S. N. Diggavi, B. C. Ng, and A. Paulraj, "Joint channel-data estimation with interference cancellation," Proc. ICC '98, Atlanta, Ga. June 1998, pp. 465–469. This paper describes a technique for estimating joint channels and data.

R. Raheli, A. Polydoros, and C.-K. Tzou, "Per-Survivor Processing: A general approach to MLSE in uncertain environments," IEEE Trans. Commun., vol. 43, pp. 354–364, February/March/April 1995. This is the seminal paper on per-survivor processing.

G. Paparisto and K. M. Chugg, "PSP array processing for multipath fading channels," IEEE Trans. Commun., vol. 47, pp. 504–507, April 1999. This paper describes PSP for ISI mitigation based on antenna array measurements.

J. Rissanen, "Modeling by shortest data description," Automatica, vol. 14, pp. 465–471, 1978. This paper describes minimum description length criteria.

It should be noted that adaptive detection using per-survivor processing is known. One approach is described in U.S. Pat. No. 5,432,821 issued Jul. 11, 1995 of Andreas Polydoros and Riccardo Raheli.

What is needed is an interference detection scheme which provides a more accurate model of a signal channel containing interference from identifiable sources.

SUMMARY OF THE INVENTION

According to the invention, in a telecommunication system, a method for co-channel interference identification and mitigation employs adaptive sequence detection in connection with a model composed of a signal of interest and a combination of other signals which constitute interference in a channel of interest, wherein the signal of interest is distinguished from the interference by adaptive tracking of signal parameters of all identifiable signals. In a particular embodiment, the process involves estimating the number and time spans of co-channel interference channels based on maximum likelihood estimation and minimum description length from training information derived from a single time division multiple access packet; and then applying the estimate to mitigation of co-channel interference at a receiver. Per-survivor-processing is one technique for adaptive sequence detection.

The invention will be better understood by reference to the following detailed description in connection with the accompanying drawings.

DESCRIPTION OF SPECIFIC EMBODIMENTS

Signal Model and Front-end Processing

Figure 1:
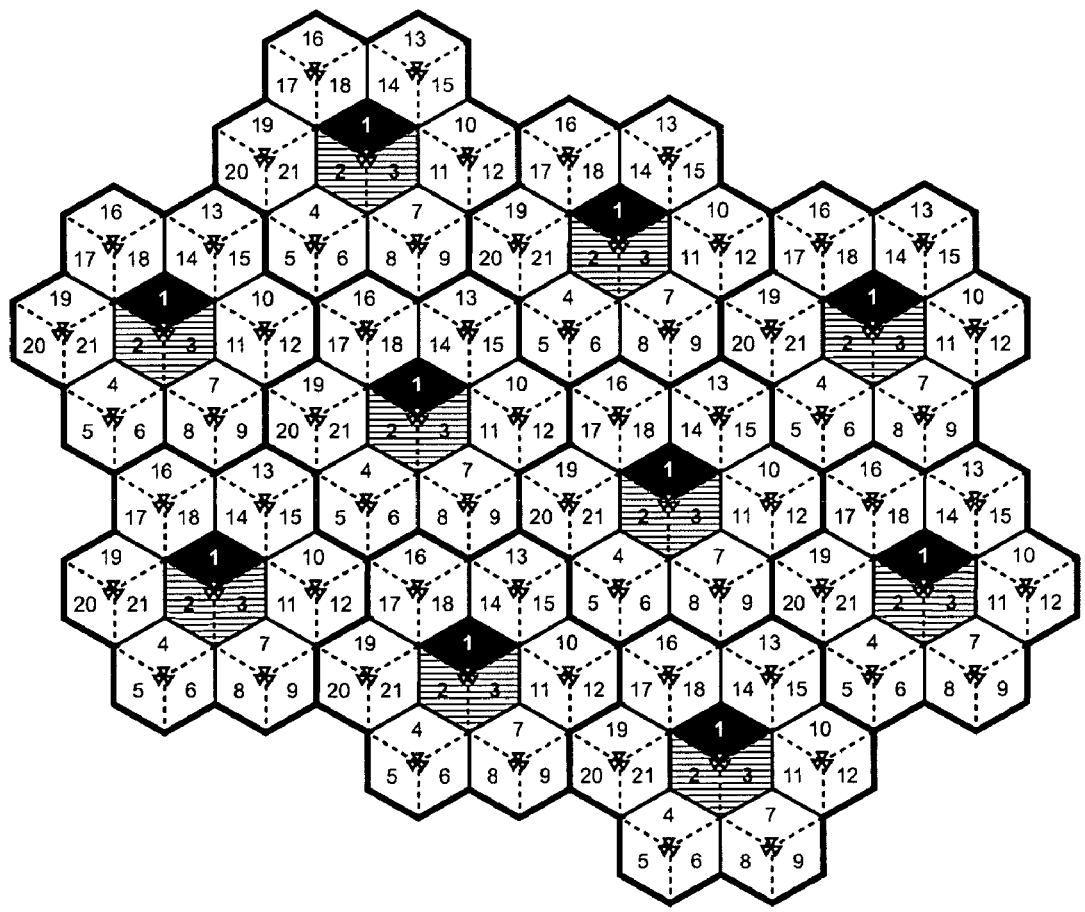
FIG. 1 is a diagram of a cellular network utilizing frequency reuse.
Figure 2:
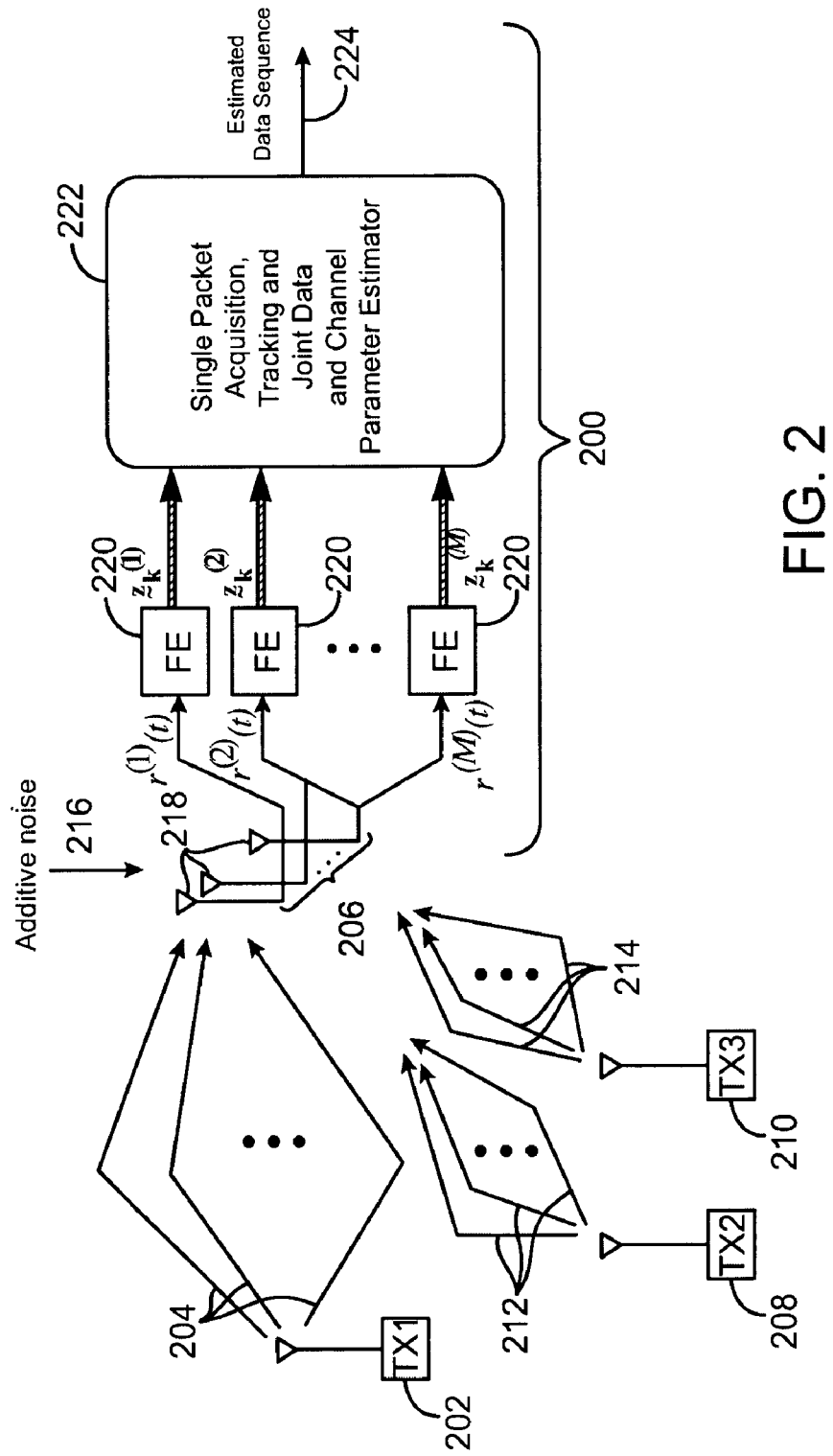
FIG. 2 is a block diagram of a receiver and channel model in accordance with the invention.

FIG. 2 is a block diagram of a receiver 200 and channel model in accordance with the invention. An Intended User (IU) 202 transmits a desired signal that is to be received by the receiver 200. The desired signal propagates along multiple paths 204 before reaching an antenna array 206 of the receiver 200. At the same time, Co-channel Interference (CCI) users 208 and 210 transmit CCI signals using the same RF frequency band as the desired signal. The CCI signals from the CCI users 208 and 210 propagate along multiple paths 212 and 214, respectively, before reaching the antenna array 206. The CCI users may be from the same cell as the IU or may be from other cells. The antenna array 206 receives additive noise 216. Thus, the combined signal received at the antenna array 206 contains a multi-path desired signal, multi-path CCI signals, and additive noise from the channel.

The antenna array 206 includes individual antenna array elements 218. Each antenna array element 218 forwards a received signal r(t) to a corresponding front end (FE) processor 220. Each FE processor performs match filtering functions on the r(t) signal it receives and produces a sampled receive signal $z_k$. The plurality of $z_k$ signals produced from the FE processors 220 are provided to a single packet acquisition, tracking and joint data and channel estimator 222. The estimator 222 produces n data sequence estimate 224 corresponding to data to be extracted from the desired signal by performing a joint detection technique on the desired signal and the CCI signals. The joint detection technique involves acquisition and tracking of channel parameters associated with a single packet of the desired signal and the CCI signals.

One embodiment of the receiver 200 and the signals shown in FIG. 2 is described below. Here, the CCI signals are assumed to have the same modulation and packet format as the desired signal from the IU. Specifically, the desired signal and each of the CCI signals is described as a complex baseband version of a digital M-ary QAM modulated signal with arbitrary pulse shaping and a slowly time-varying multipath channel. The antenna array 206 is assumed to have M elements 218, each connected to a Fractionally-Spaced Whitened Matched Filter (FS-WMF) FE processor 220, matched to the shaping pulse of the IU and sampled every $T_s$ sec. The desired signal and the CCI signals are assumed to be narrowband signals having the same pulse shaping (signature).

In this embodiment, the physical channel is assumed to be a time-varying Transmission Delay Line (TDL) with minimum resolvable spacing between paths $T_c$. The overall impulse response (IR) of the $i^{th}$ signal at the $m^{th}$ array element is:

$$h^{(m),i}(c^{(m),i};\theta^i) = V^i \cdot F^{(m)}(\theta^i) \cdot c^{(m),i} \quad \text{(Eq. 1)}$$

where the matrix $V^i$ is determined by the pulse shaping and relative delay of the $i^{th}$ signal, as well as the FE processors 220. The model in Eq. 1 encompasses a range of channel models from purely specular to diffuse. This is accomplished by specifying the array response $F^{(m)}(\theta^i)$ and the joint statistics of the physical channel vectors. The time spans of the overall IR of channel $h^{(m),i}$ is denoted by $L_i$ for all m.

The outputs of M FE processors 220 at time k, augmented in vector $z_k$, can be expressed as $$z_k = \sum_{i=1}^{N_I} A_k^i \diamond h_k^i + w_k = A_k^1 \diamond h_k^1 + \sum_{i=2}^{N_I} A_k^i \diamond h_k^i + w_k \quad \text{(Eq. 2)}$$

The vectors $h_k^i$ contain IR vectors of M branches, $h^{(m),i}$, and the matrices $A_k^i$ are constructed from the transmitted data sequences. The "mixed inner product" ($\diamond$ operator) is an expression used extend the baud-spaced signal convolution model to a fractionally-spaced one. The noise $w_k$ represents the effect of independent additive white Gaussian processes at each array element 218 with power spectral level $N_0$. It follows that $w_k$ is a circular white Gaussian process, independent between array elements 218 and subsamples, with each subsample process having power $N_0$.

A compact form of Eq. 2 may be obtained by rewriting it as $$z_k = [A_k^1 \ldots A_k^{N_I}] \diamond \begin{bmatrix} h_k^1 \\ \vdots \\ h_k^{N_I} \end{bmatrix} + W_k \triangleq A_k \diamond h_k + w_k \quad \text{(Eq. 3)}$$

where $A_k$ and $h_k$ are defined as per Eq. 3.

Channel and CCI Identification

Figure 3:
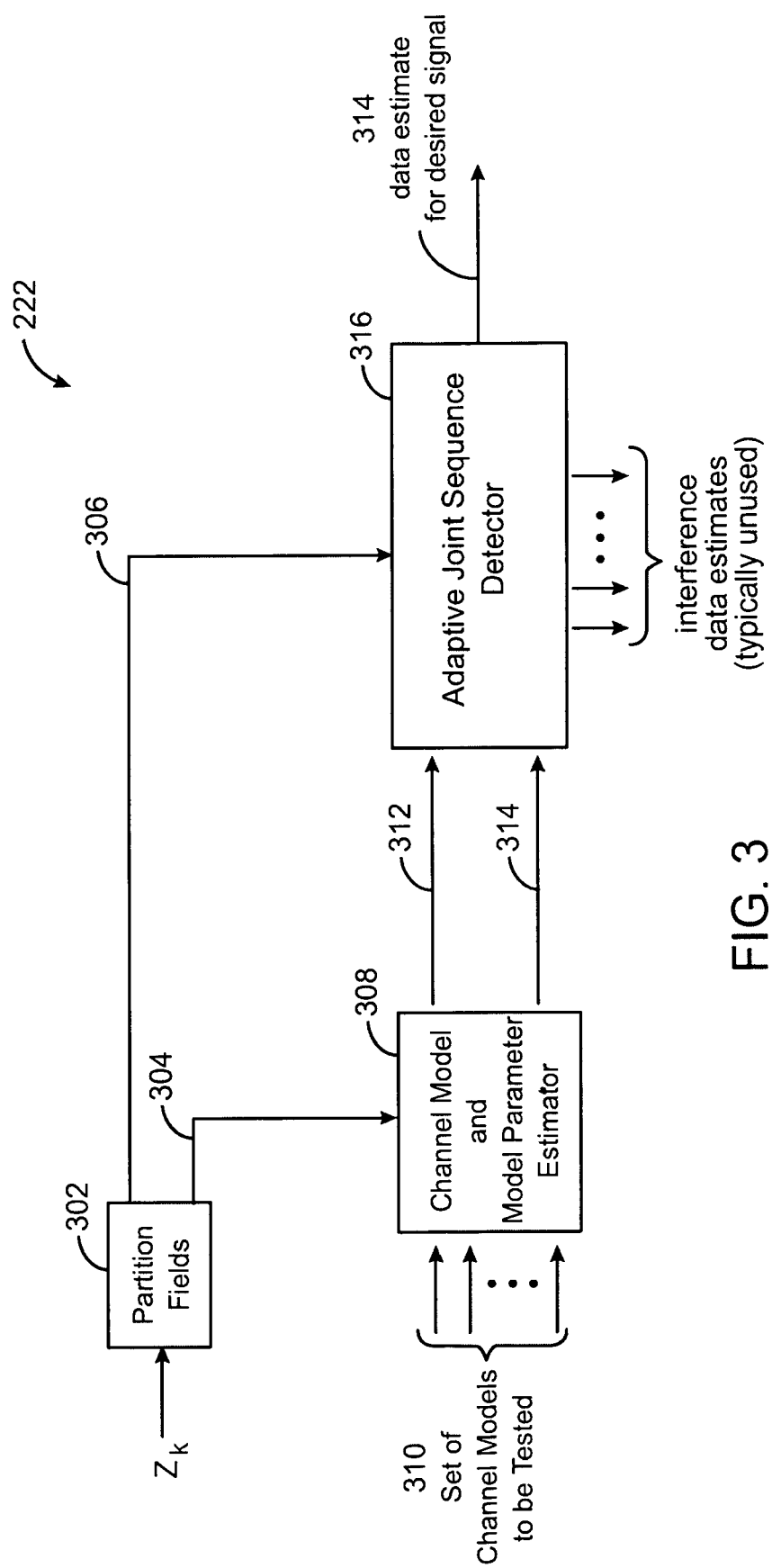
FIG. 3 is a block diagram of a single packet acquisition, tracking and joint data and channel estimator according to the invention.

FIG. 3 is a block diagram of the single packet acquisition, tracking and joint data and channel estimator 222 according to the invention. The estimator 222 performs acquisition and tracking tasks by separately processing a training portion and a data portion of each received signal. A field partitioning block 302 receives the $z_k$ signals provided to the estimator 222 and separates each $z_k$ signal into a training portion 304 and a data portion 306.

The field partitioning block 302 provides the training portions 304 of the $z_k$ signals to a channel model and model parameter estimator 308. The channel model and model parameter estimator 308 also receives a set 310 of channel models to be tested. Using this information, the channel model and model parameter estimator 308 produces a channel model 312 and an initial estimate 314 of corresponding model parameters for the channel model. This is accomplished by testing the set 310 of channel models to determine the best model and corresponding model parameter estimates for the best model.

Alternatively, the channel model and model parameter estimator 308 can internally generate the set 310 of channel models to be tested. In this alternative embodiment, the channel model and model parameter estimator 308 receives information (not shown), such as a set of possible training sequences corresponding to the desired signal from the IU and potential CCI signals from interferers, that enables the channel model and model parameter estimator 308 to generate the set of channel models to be tested.

Each channel model, such as members of the set 310 of channel models to be tested and the channel model 312, includes an estimate of the number of CCI signals present in the channel. Each channel model can also include an estimate of the time span of the Impulse Response (IR), or intersymbol interference channel response associated with the desired signal and each CCI signal. Furthermore, each channel model can include an estimate of the specific combination of training sequences in the training portion assigned for the desired signal and the CCI signals, assuming that the each of the desired signal and the CCI signals may be assigned a different training sequence. The model parameters initial estimate 314 includes an estimate of the coefficients of the IR, or intersymbol interference channel response, associated with the desired signal and each CCI signal.

One embodiment of the channel model and model parameter estimator 308 shown in FIG. 3 is described below. Here, each of the desired signal and CCI signals is assumed to be a time-division multiple access (TDMA) packet having a training sequence during a training portion. All possible training sequences, each consisting of N symbols, are assumed to be known at the receiver. Furthermore, the received training sequences are assumed to be synchronized between users, with the overall IR of the desired signal and CCI signals experience little or no change during the training portion.

According to this embodiment, the outputs $z_k$ from the FE processors 220 corresponding to the $n_s^{th}$ ($n_s=1, \ldots N_s$) sample of the $m^{th}$ (m=1, . . . M) array element can be arranged in an (N×1) vector $z_{n_s}^{(m)}$ which can be expressed as $$z_{n_s}^{(m)} = A_L \cdot h_{n_s}^{(m)} + w_{n_s}^{(m)} \quad \text{(Eq. 4)}$$

where $$A_L = \begin{bmatrix} a_1^1 & \cdots & a_{1-L_1+1}^1 & \cdots & a_1^{N_I} & \cdots & a_{1-L_{N_I}+1}^{N_I} \\ \vdots & \ddots & \vdots & \ddots & \vdots & \ddots & \vdots \\ a_N^1 & \cdots & a_{N-L_1+1}^1 & \cdots & a_N^{N_I} & \cdots & a_{N-L_{N_I}+1}^{N_I} \end{bmatrix} \quad \text{(Eq. 5)}$$

is the (N×L) data matrix. Here, a combined time span, L, is defined as the sum of the individual time spans, $L_i$. $L_i$ is the time span of the IR, or the intersymbol interference channel response, associated with the $i^{th}$ signal. $N_I$ is the total number of modeled signals present in the channel, including the desired signal and the CCI signals. Also, $a_k^i$ is the $k^{th}$ data symbol of the $i^{th}$ signal's training sequence, $h_{n_s}^{(m)}$ is the (L×1) overall IR vector and $w_{n_s}^{(m)}$ is a zero-mean, complex Gaussian random vector with covariance matrix $N_o I_{N \times N}$. Since the noise is independent between samples and array elements, conditioned on the overall IR vector, the probability density function (pdf) of the FE output vector over all samples and array elements, f(z|h), is given by $$\frac{1}{(\pi N_O)^{MN_sN}} \exp\left[-\frac{\sum_{m=1}^{M} \sum_{n_s=1}^{N_s} \|z_{n_s}^{(m)} - A_L \cdot h_{n_s}^{(m)}\|^2}{N_O}\right] \quad \text{(Eq. 6)}$$

The problem of determining the number of CCI signals and the time spans $L_i$ is a model selection problem, which can be stated as follows: Given the FE output vector and a parameterized family of pdf's given by Eq. 6, select the model (i.e., the parameters $N_I$ and $\{L_i\}_{i=1}^{N_I}$) that best fits this output. Here, The present embodiment uses a Minimum Description Length (MDL) principle to select the model that minimizes $$MDL(N_I, \{L_i\}_{i=1}^{N_I}) = -\ln[f(z \mid \hat{h})] + \frac{1}{2}p\ln[N] \quad \text{(Eq. 7)}$$

where $\hat{h}$ is the ML estimate of h, with elements $$\hat{h}_{n_s}^{(m)} = [A_L^H A_L]^{-1} A_L^H \cdot z_{n_s}^{(m)} \quad \text{(Eq. 8)}$$

and p is the number of unknown parameters in the particular model. Substituting Eq. 8 into Eq. 6 and noticing that the number of unknown parameters in the model of Eq. 4 is $2LMN_s$, Eq. 7 becomes $$MDL(N_I, \{L_i\}_{i=1}^{N_I}) = \frac{1}{N_O}\sum_{m=1}^{M}\sum_{s=1}^{N_s}\frac{1}{N}\|P_L^\perp \cdot z_{n_s}^{(m)}\|^2 + LMN_s\ln[N] \quad \text{(Eq. 9)}$$

where $$P_L^\perp = I_{N \times N} - A_L[A_L^H A_L]^{-1} A_L^H \quad \text{(Eq. 10)}$$

Note that the maximum likelihood (ML) estimate of the overall IR vector (coefficients of the intersymbol interference channel response associated with the desired signal and each CCI signal), which can be used for the initialization of the adaptive joint sequence detector 302, is obtained as a by-product of the model determination algorithm.

Tracking and Joint Modeling

Referring again to FIG. 3, the field partitioning block 302 provides the data portions 306 of the $z_k$ signals to an adaptive joint sequence detector 316. The detector 316 also receives the channel model 312 and the model parameters initial estimate 314 from the channel model and model parameter estimator 308. From this information, the adaptive joint sequence detector generates the data sequence estimate 224 corresponding to data to be extracted from the desired signal.

At the adaptive joint sequence detector 316, the structure of the IU and the CCI channels are known because the channel model 312 provides an estimate of the number of CCI signals present and an estimate of the time span of the IR, or intersymbol interference channel response associated with the desired signal and each CCI signal. Thus, the maximum likelihood (ML) solution for the data sequences of the IU and the CCI could be obtained through the Viterbi Algorithm (VA). A joint trellis for the VA algorithm can be constructed, with states defined as $$\sigma_k = \left(a_{k-1}^1, \ldots, a_{k-L_1+1}^1, \ldots, a_{k-1}^{N_I}, \ldots, a_{k-L_{N_I+1}}^{N_I}\right) \quad \text{(Eq. 11)}$$

The branch metrics of the VA are computed as follows:

$$\Gamma(\sigma_k, \sigma_{k+1}) = \|z_k - A_k(\sigma_k, \sigma_{k+1}) \diamond h_k\|^2 \quad \text{(Eq. 12)}$$

where the data matrix $A_k(\sigma_k,\sigma_{k+1})$ is constructed based on the hypothesized data symbols corresponding to the transition $\sigma_k \to \sigma_{k+1}$. The trellis size is determined by the time spans $L_i$. As defined previously, $L_i$ is the time span of the IR, or the intersymbol interference channel response, associated with the $i^{th}$ signal. The joint trellis has $M^{L-N_I}$ states, with $M^{N_I}$ branches entering each state.

To carry out the VA algorithm described above, the adaptive joint sequence detector 316 may be realized in distinct implementations, including (1) a conventional adaptive Maximum Likelihood Sequence Detection (CA-MLSD) processor and (2) a per-survivor processing (PSP) Maximum Likelihood Sequence Detection (PSP-based MLSD) processor.

Figure 4A:
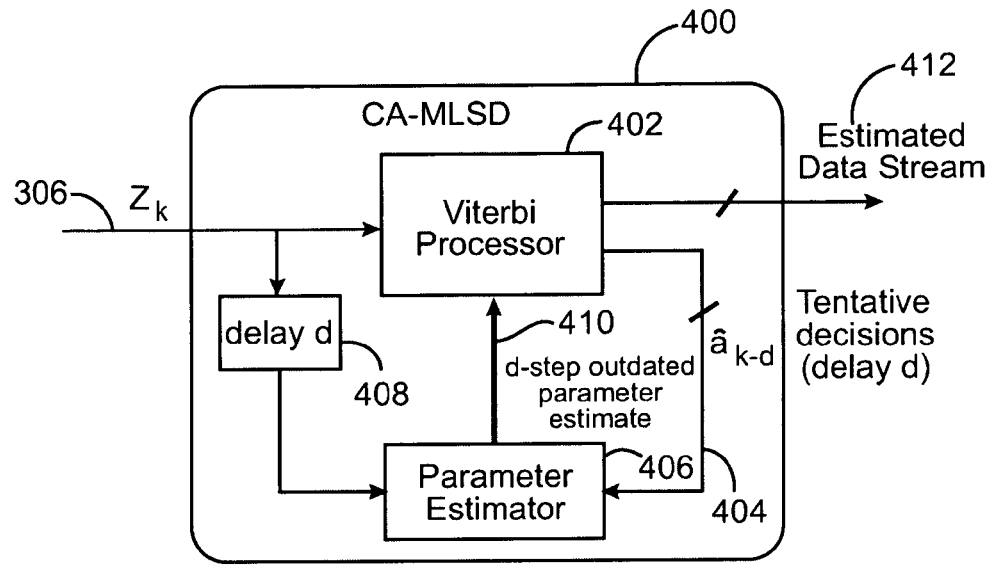
FIG. 4A is a block diagram of a conventional adaptive Maximum Likelihood Sequence Detection (CA-MLSD) processor.

FIG. 4A is a block diagram of CA-MLSD processor 400. The CA-MLSD processor 400 performs branch metric calculations according to Eq. 12, according to a single delayed decision feedback estimation adaptive sequence detection technique. The data portions 306 of the $z_k$ signals are input to the CA-MLSD processor 400 and provided to a Viterbi processor 402. The Viterbi processor 402 outputs tentative decisions 404 having a tentative delay d to a parameter estimator 406. The data portions 306 of the $z_k$ signals are also provided to a delay block 408 providing the same delay d. The delay block 408 provides its output to the parameter estimator 406. The parameter estimator generates a d-step outdated parameter estimate 410 back to the Viterbi processor 402. The Viterbi processor 402 generates an estimated data stream 412 containing data extracted from the data portion of each of the desired signal and the CCI signals. Note the channel model 312 (not shown) is provided to the CA-MLSD processor 400 such that the structure of the IU and the CCI channels are known.

Figure 4B:
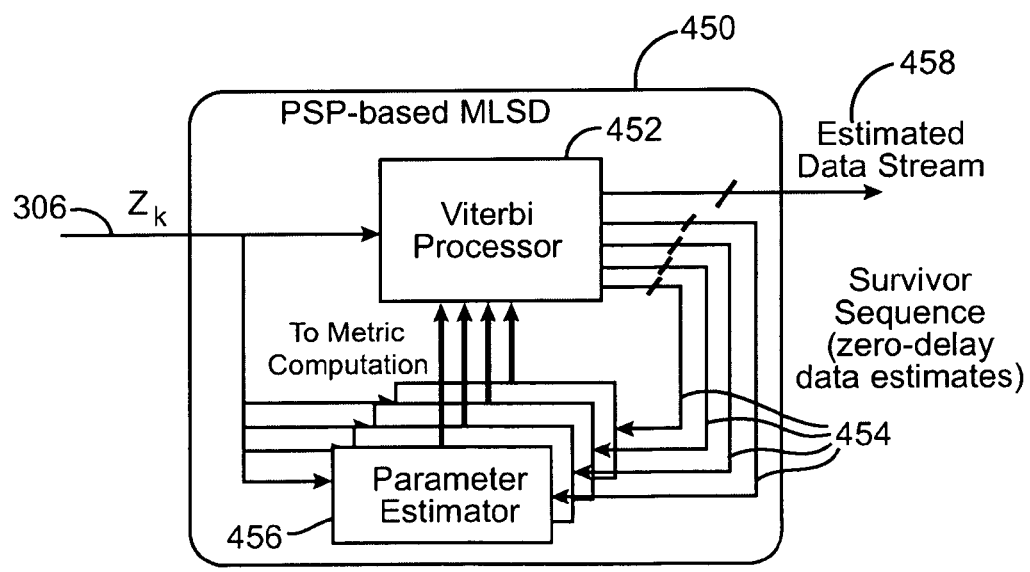
FIG. 4B is a block diagram of a per-survivor processing Maximum Likelihood Sequence Detection (PSP-based MLSD) processor.

FIG. 4B is a block diagram of a PSP-based MLSD processor 450. Since the IR, or intersymbol interference channel response coefficients are time-varying in mobile systems, PSP-based methods can be employed to approximate the ML solution. In this case, the branch metric computations of Eq. 12 are modified as $$\Gamma(\sigma_k,\sigma_{k+1}) = \|z_k - A_k(\sigma_k,\sigma_{k+1}) \diamond \hat{h}(\sigma_k)\|^2 \quad \text{(eq. 13)}$$

where $\hat{h}(\sigma_k)$ is the estimate of the overall IR vector, $h_k$, computed at step k−1, based on the survivor sequence corresponding to state $\sigma_k$.

The PSP-based MLSD processor 450 performs branch metric calculations according to Eq. 13. The data portions 306 of the $z_k$ signals are input to the PSP-based MLSD processor 450 and provided to a Viterbi processor 452. The Viterbi processor 452 outputs a plurality of survivor sequences 454, which are zero-delay data estimates, to a plurality of parameter estimators 456. The data portions 306 of the $z_k$ signals are also input to each of the plurality of parameter estimators 456. Each parameter estimator 456 provides a parameter estimate back to the Viterbi processor 452. The Viterbi processor 452 generates an estimated data stream 458 containing data extracted from the data portion of each of the desired signal and the CCI signals. Note the channel model 312 (not shown) is provided to the PSP-based MLSD processor 450 such that the structure of the IU and the CCI channels are known.

Figure 5:
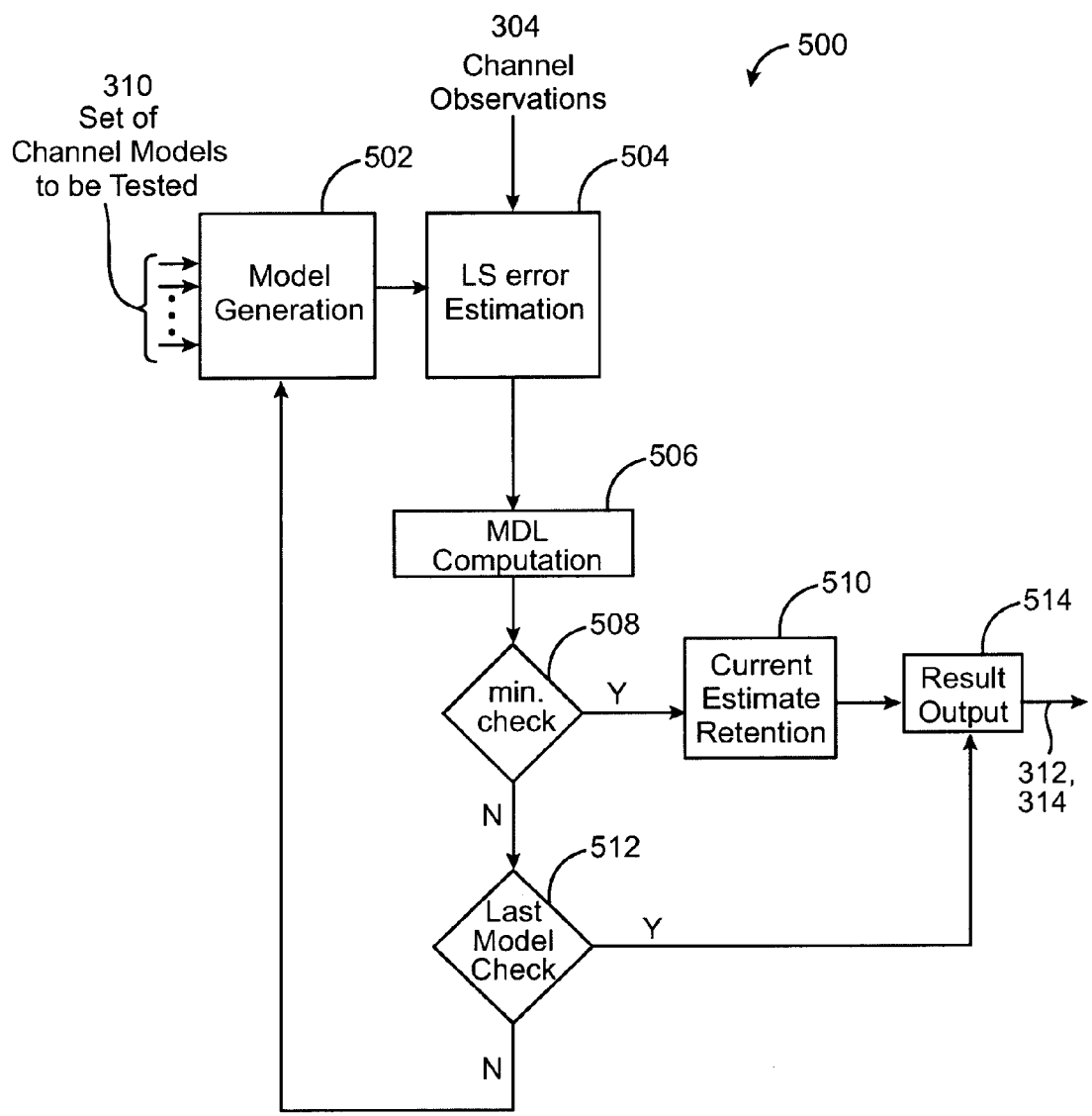
FIG. 5 is a functional block diagram of a process for determining the estimate of the channel model and the initial estimate of corresponding model parameters.

FIG. 5 is a functional block diagram 500 of a process for determining the estimate 312 of the channel model and the initial estimate 314 of corresponding model parameters. The process may be implemented in the channel model and model parameter estimator 308. First, a model generation step 502 receives the set 310 of channel models to be tested and selects a current model from this set of channel models.

In an alternatively embodiment, the set 310 of channel models to be tested can be internally generated within the model generation step 502.

The range of possible channel models is constructed by modifying one or more of the following variables: (1) $N_I$, the number of modeled signals, which includes the desired signal and all of the CCI signals (assuming there is always one desired signal, controlling this variable is equivalent to varying the number of CCI signals), (2), $\{L_i\}_{i=1}^{N_I}$, $L_i$ being the time span of the IR, or the intersymbol interference channel response, associated with the $i^{th}$ signal. and (3), $\{a_i\}_{i=1}^{N_I}$, the training sequence in the training portion of each of the modeled signals.

Next, a least square (LS) error estimation step 504 generates a residual LS error calculation by comparing the current model with channel observations during the training portion of the received signal. Here, the channel observations may be the training portions 304 of the $z_k$ signals, discussed previously. The LS error estimation step also produces a current joint channel estimate, which comprises model parameters corresponding to the current model. In a Minimum Description Length (MDL) computation step 506, a current MDL value is computed according to Eq. 9 and Eq. 10.

A minimum check step 508 compares the current MDL value (most recently computed) against the minimum MDL value generated thus far. If the current MDL value is less than the minimum MDL value, the current MDL value is recorded as the new minimum MDL value, and a current estimate retention step 510 records the current model and current joint channel estimate. Else, a last model check step 512 checks to see if the selected model is the last model in the range of possible channel models.

If the selected model is the not last model in the range of possible channel models, the process returns to the model generation step 502, and the steps described above are repeated. If the selected model is the last model in the range of possible channel models, a result output step 514 outputs the model and joint channel estimate last recorded by the current estimate retention step 510. This output constitutes the estimate 312 of the channel model and the initial estimate 314 of corresponding model parameters.

The invention has been explained with reference to specific embodiments. Other embodiments will be evident to those of ordinary skill in the art. It is therefore not intended that this invention be limited, except as indicated by the appended claims.

What is claimed is:

1. In a telecommunication system, a method for co-channel interference identification and mitigation comprising:

estimating the number co-channel interference signals and time spans of channel responses associated with the co-channel interference signals, based on maximum likelihood estimation and minimum description length from training information derived from a single time division multiple access packet; and applying said estimating to mitigation of co-channel interference at a receiver.

2. A method for extracting information from a desired signal using a received signal in the presence of at least one co-channel interference signal and intersymbol interference while simultaneously demodulating both the desired signal and the at least one co-channel interference signal, said method comprising:

capturing said received signal as channel observations;

determining a channel model and an initial estimate of corresponding model parameters for said channel model using said channel observations during a training portion, said channel model including an estimate of the number of co-channel interference signals present; and performing a joint sequence detection calculation on said channel observations during a data portion using said channel model and at least one current estimate of said model parameters thereby to produce an estimate of data representing said desired signal during said data portion.

3. The method according to claim 2 wherein said channel model and initial estimate determining step comprises:

testing a pre-selected set of channel models to determine a best model and corresponding model parameter estimates for said best model.

4. The method according to claim 3 wherein said channel model further includes an estimate of a time span of intersymbol interference channel response for the desired signal and each co-channel interference signal, and a combination of training sequences in the training portion for the desired signal and the co-channel interference signals.

5. The method according to claim 3 wherein said best model is determined based on a minimum description length criterion associated with a joint least squares estimate of intersymbol interference channels of said pre-selected set of said channel models based on said channel observations during said training portion.

6. The method according to claim 5 wherein said joint least squares estimate is obtained by updating a least squares solution of a first impulse response to apply to an impulse response longer than the first impulse response.

7. The method according to claim 2 wherein said joint sequence detection is rendered adaptive by repeatedly updating said at least one estimate of said model parameters.

8. The method according to claim 7 wherein said model parameters comprise coefficients of the intersymbol interference channel response for the desired signal and each co-channel interference signal.

9. The method according to claim 7 wherein said adaptive joint sequence detection is performed using per-survivor processing adaptive sequence detection.

10. The method according to claim 7 wherein said adaptive joint sequence detection is performed using single delayed decision feedback estimation adaptive sequence detection.

11. The method according to claim 10 wherein said adaptive sequence detection further includes reduced state techniques in order to reduce complexity.

12. The method according to claim 9 wherein said adaptive sequence detection further includes reduced state techniques in order to reduce complexity.

13. The method according to claim 8 wherein said adaptive sequence detection further includes reduced state techniques in order to reduce complexity.

14. The method according to claim 7 wherein said adaptive sequence detection further includes reduced state techniques in order to reduce complexity.

15. The method according to claim 2 wherein said sequence detection further includes reduced state techniques in order to reduce complexity.

16. The method according to claim 2 wherein said current estimate of model parameters is said initial estimate of model parameter for use in a system having negligible dynamic channel variation.

17. The method according to claim 2 wherein said training portion and said data portion are contained within a common packet.

18. The method according to claim 17 wherein said common data packet comprises a single burst within a time division multiple access (TDMA) frame.

19. The method according to claim 2 wherein said joint sequence detection is performed according to a trellis structure based on the number of co-channel interference signals present as estimated by said channel model.

20. The method according to claim 2 wherein said channel model is constrained to a predetermined number of co-channel interference signals and further constrained, for the desired signal and each one of said co-channel interference signals, to a predetermined time span of intersymbol interference channel response and a predetermined training sequence.

21. The method according to claim 20 wherein said joint sequence detection is rendered adaptive by repeatedly updating said at least one estimate of said model parameters.

22. The method according to claim 21 wherein said model parameters comprise coefficients of intersymbol interference channel response for the desired signal and each co-channel interference signal.

23. The method according to claim 21 wherein said adaptive joint sequence detection is performed using per-survivor processing adaptive sequence detection.

24. The method according to claim 21 wherein said adaptive joint sequence detection is performed using single delayed decision feedback estimation adaptive sequence detection.

25. The method according to claim 24 wherein said adaptive sequence detection further includes reduced state techniques in order to reduce complexity.

26. The method according to claim 23 wherein said adaptive sequence detection further includes reduced state techniques in order to reduce complexity.

27. The method according to claim 22 wherein said adaptive sequence detection further includes reduced state techniques in order to reduce complexity.

28. The method according to claim 21 wherein said sequence detection further includes reduced state techniques in order to reduce complexity.

29. The method according to claim 20 wherein said sequence detection further includes reduced state techniques in order to reduce complexity.

30. The method according to claim 20 wherein said current estimate of model parameters is said initial estimate of model parameter for use in a system having negligible dynamic channel variation.

31. The method according to claim 20 wherein said training portion and said data portion are contained within a common packet.

32. The method according to claim 31 wherein said common data packet comprises a single burst within a time division multiple access (TDMA) frame.

33. The method according to claim 20 wherein said joint sequence detection is performed according to a trellis structure based on said predetermined number of co-channel interference signals.

34. A system for extracting information from a desired signal using a received signal in the presence of at least one co-channel interference signal and intersymbol interference while simultaneously demodulating both the desired signal and the at least one co-channel interference signal, said system comprising:
 a receiver for capturing said received signal as channel observations;
 a channel model and an initial value estimator for estimating a channel model and an initial estimate of corresponding model parameters for said channel model using said channel observations during a training portion, said channel model including an estimate of the number of co-channel interference signals present; and
 a joint sequence detector for calculating a joint sequence on said channel observations during a data portion using said channel model and at least one current estimate of said model parameters thereby to produce an estimate of data representing said desired signal during said data portion.

35. The system of claim 34 wherein said joint sequence detector is a trellis-based maximum-likelihood sequence detector.

* * * * *